US006352947B1

(12) United States Patent
Haley et al.

(10) Patent No.: US 6,352,947 B1
(45) Date of Patent: Mar. 5, 2002

(54) HIGH EFFICIENCY THERMALLY BONDED WET LAID MILK FILTER

(75) Inventors: Clement J. Haley, Mifflinburg, PA (US); Larry L. Kinn, Franklin, MA (US)

(73) Assignee: BBA Nonwovens Simpsonvillle, Inc., Simpsonville, SC (US)

( * ) Notice: Subject to any disclaimer, the term of this patent is extended or adjusted under 35 U.S.C. 154(b) by 0 days.

(21) Appl. No.: 09/328,675

(22) Filed: Jun. 9, 1999

Related U.S. Application Data (60) Provisional application No. 60/088,566, filed on Jun. 10, 1998.

(51) Int. Cl.[7] .......................... B32B 27/04; B32B 27/12
(52) U.S. Cl. ....................... 442/364; 442/103; 442/361; 442/415; 428/357; 428/373
(58) Field of Search ................................ 428/357, 373; 442/103, 361, 364, 415

(56) References Cited

U.S. PATENT DOCUMENTS

| | | | |
|---|---|---|---|
| 3,622,446 A | 11/1971 | Burnham | |
| 3,674,621 A | 7/1972 | Miyamoto et al. | 162/146 |
| 3,730,830 A | 5/1973 | Driscoll et al. | 162/146 |
| 4,274,914 A | 6/1981 | Keith et al. | 162/109 |
| 4,917,714 A | 4/1990 | Kinsley, Jr. | 55/524 |
| 4,963,230 A | 10/1990 | Kawase et al. | 162/129 |
| 4,973,382 A | 11/1990 | Kinn et al. | 162/146 |
| 5,094,717 A | 3/1992 | Manning et al. | 162/111 |
| 5,106,457 A | 4/1992 | Manning | 162/115 |
| 5,167,764 A | 12/1992 | Nielsen et al. | 162/146 |
| 5,186,843 A | 2/1993 | Baumgardner et al. | 210/767 |
| 5,242,546 A | 9/1993 | Evans et al. | 162/146 |
| 5,244,482 A | 9/1993 | Hassenboehler et al. | |
| 5,415,738 A | 5/1995 | Mehta et al. | 162/146 |
| 5,607,414 A * | 3/1997 | Richards et al. | 604/378 |
| 5,851,355 A | 12/1998 | Goettmann | |
| 5,883,026 A | 3/1999 | Reader et al. | 424/382 |

FOREIGN PATENT DOCUMENTS

| | | | |
|---|---|---|---|
| GB | 1487995 | 10/1977 | |
| GB | 2068433 | 8/1981 | |
| WO | WO 85/04620 | 10/1985 | B32B/5/28 |

* cited by examiner

*Primary Examiner*—Terrel Morris
*Assistant Examiner*—Ula C. Ruddock
(74) *Attorney, Agent, or Firm*—Ostrager Chong & Flaherty LLP (57) ABSTRACT

A filtration fabric which is composed of 15.0 to 100.0% binder fiber, 0.0 to 85.0% pulp portion, 0.0% to 15.0% latex binder or other stiffening agent. A filter media made of the fabric has an improved flow rate averaging no more than 21 seconds, while maintaining an average sediment retention of 70% and minimum wet burst strength of about 40 psi to about 50 psi, preferably about 50 psi.

4 Claims, 3 Drawing Sheets

HIGH EFFICIENCY THERMALLY BONDED WET LAID MILK FILTER

This application claims the benefit of U.S. provisional application No. 60/088,566 filed Jun. 10, 1998.

TECHNICAL FIELD

This invention generally relates to a nonwoven fabric for use in filtration of food and non-food liquids and semi-solids, particularly dairy products such as milk, yogurt and cheese. The fibers in the nonwoven fabric of the invention are primarily thermally bonded.

BACKGROUND OF THE INVENTION

Nonwoven fabrics for use as filters are known in the art. Typically, filter disks, socks or tubes are formed from a binder-impregnated sheet of nonwoven fibers. The filter sheet is fabricated to have a porosity for filtering sediment and other contaminants from a liquid or semi-solid, such as raw milk from a dairy farm.

The most critical physical milk filter properties are:
1—high flow rate; 2—good sediment retention; 3—high wet burst strength; 4—high wet tensile strength; 5—good surface wettability (i.e. the substrate is very hydrophilic). The surface of the web must have good fiber and wood pulp tie down in which most of the fibers are bonded well to the surface of the substrate.

Milk filters having a minimum wet burst strength of about 40 to about 50 psi are known to perform well in the field. High flow rate signifies the ability to filter a greater volume of milk before the filter becomes plugged with undesirable sediment. High flow rate filters are particularly advantageous in light of the consolidation of small farms into large dairies. Filters used in connection with comestibles must also meet all relevant government regulations. For example, the current U.S. Food and Drug Administration regulations for milk filters require that the extractable mass must be below 2.8% of the dry weight of the test sample after two hours in distilled water at 100° F. (37.78° C.).

One example of a prior art filter, U.S. Pat. No. 4,973,382, describes a wet laid fabric made from fibers of dissimilar denier and length which are secured together with a liquid binder in an amount of 20–35% based on dry fabric weight. U.S. Pat. No. 4,973,382 is incorporated in the present application by reference. Using a large amount of liquid binder in a milk filter has the disadvantage that large bond points are formed at the fiber interstices, which can significantly reduce the fabric's open pore area and adversely affect flow rate.

SUMMARY OF INVENTION

The filtration fabrics of this invention have an improved flow rate averaging no more than 25 seconds, preferably averaging no more than 21 seconds, while maintaining the prior art's average sediment retention of 70% and minimum wet burst strength of about 40 psi to about 50 psi, preferably about 50 psi. Some of the filtration fabrics demonstrate improved flow and increased filtration properties such as sediment retention. A particular preferred embodiment of the invention results in a product having a sediment retention of at least 79% and a flow rate of about 11–12 seconds.

The filtration fabrics can be produced having the following composition:

| | |
|---|---|
| 15.0% to 100.0% (preferably 40 to 75%) | binder fiber |
| 0.0% to 85.0% (preferably 25 to 60%) | synthetic matrix fibers, cellulosic or natural fibers and pulps (collectively referred to as "the pulp portion") |
| 0.0% to 15.0% | latex or other type of stiffening agent |
| 0.0% to 2.0% | rewetting surfactant added with stiffening agent (optional) |
| 0.15% to 2.0% | viscosity modifier in furnish (optional) |
| 0.0% to 5.0% | rewetting or non-rewetting surfactant in furnish (optional) |

Various furnishes known within the art can be employed as needed. A furnish is defined as all of the fibers and pulps combined to make the nonwoven product.

The furnish fiber percentages and viscosity modifier amounts are calculated as a percentage of the dry weight of the furnish components. The amount of rewetting or non-rewetting surfactant added in the furnish is also calculated as a percentage of the dry weight of the furnish components.

The amount of latex binder or other stiffening agent is calculated as a percentage of the total dry weight of the final fabric. In a preferred embodiment of the invention, the percentage of latex binder is about 4 to 5%. The amount of rewetting surfactant added with the binder is calculated as a percentage of the total dry weight of the final fabric.

The basis weight can vary from 0.5 oz/yd$^2$ to 5.0 oz/yd$^2$, preferably 1.5 oz/yd$^2$ to 2.5 oz/yd$^2$.

Binder fibers can include the following bicomponents: co-polypropylene, polypropylene/polyethylene, polyester/polyethylene, co-polyester, and co-nylons. Side-by-side or sheath/core bicomponent binder fibers can be used. Sheath/core, bicomponent fibers are the preferred binder fiber and can be concentric or non-concentric. These preferred fibers are characterized in that the sheath portion of the bicomponent has a melting temperature lower than the core portion of the fiber. The melting temperature of the sheath portion can be about the same or lower than the temperature at which the newly formed wet laid sheet is dried, and the melting temperature of the core can be about the same or above the drying temperature. In the preferred embodiment, the sheath has a melting temperature lower than the core and slightly lower than the temperature at which the fabric is dried. Polyvinyl alcohol or other monocomponent binder fibers can be utilized.

Other co-binders, which are suitable, as filter media for liquefied food and beverages include polyvinyl acetate, ethylene vinyl acetate, methyl and/or ethyl acrylate homopolymers and copolymers, acrylic/styrene copolymers, and styrene-butadiene copolymers.

Synthetic matrix fibers such as acrylics, nylons, polyesters (e.g. polyethylene terephthalate (PET)), polypropylene, and polyvinyl alcohol, wood pulps, natural fibers such as rayon, cellulose acetate and cotton can be included, individually or in various combinations, as the pulp portion of the filters of this invention.

Various rewetting and non-rewetting surfactants, viscosity modifiers and stiffening agents known to the art can also be employed as desired for a particular application. A rewetting surfactant promotes rewetting once fabric sheets are dried, whereas a non-rewetting surfactant will not promote rewetting once fabric sheets are dried. A preferred rewetting surfactant is sodium dioctyl sulfosuccinate. It is well known in the art to select among commercially available products to match process capabilities.

Other objects, features, and advantages of the present invention will be explained in the following detailed description of the drawings having reference to the appended drawings.

DETAILED DESCRIPTION OF INVENTION
Wet Laid Forming Process

Figure 1:
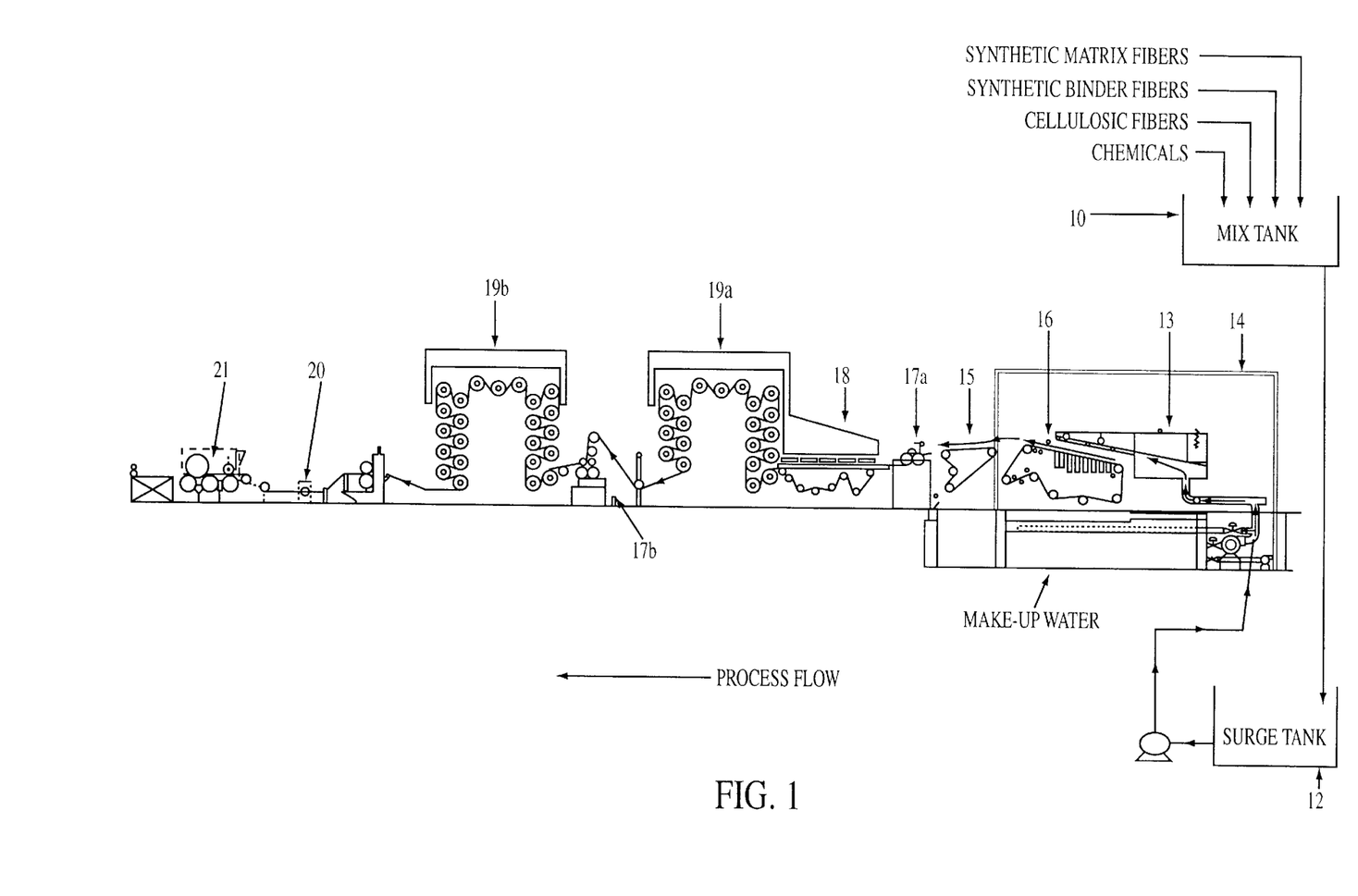
FIG. 1 is a schematic illustration of a production apparatus for producing the nonwoven filtration fabric in accordance with the invention.
Figure 2:
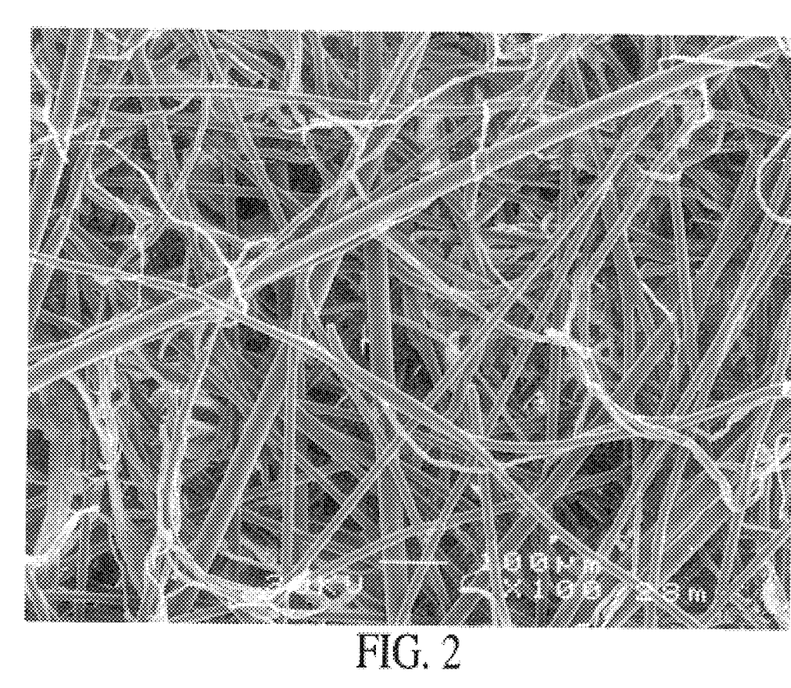
FIG. 2 is a photomicrograph at 100× magnification of the surface of Example 3—Product 2 filtration fabric, which illustrates the plurality of fibers.
Figure 3:
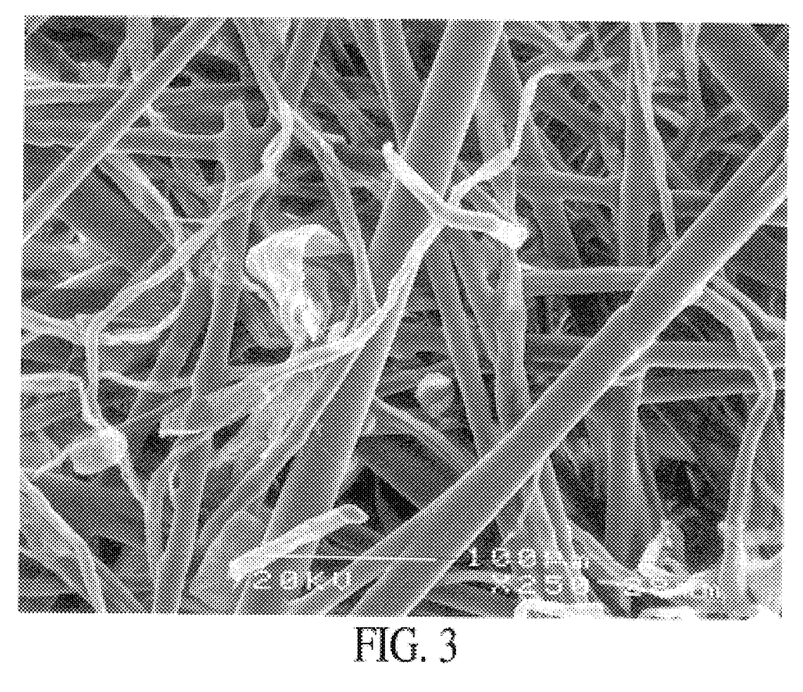
FIG. 3 is a photomicrograph at 250× magnification of the surface of Example 3—Product 2 filtration fabric showing the fiber tiedown.
Figure 4:
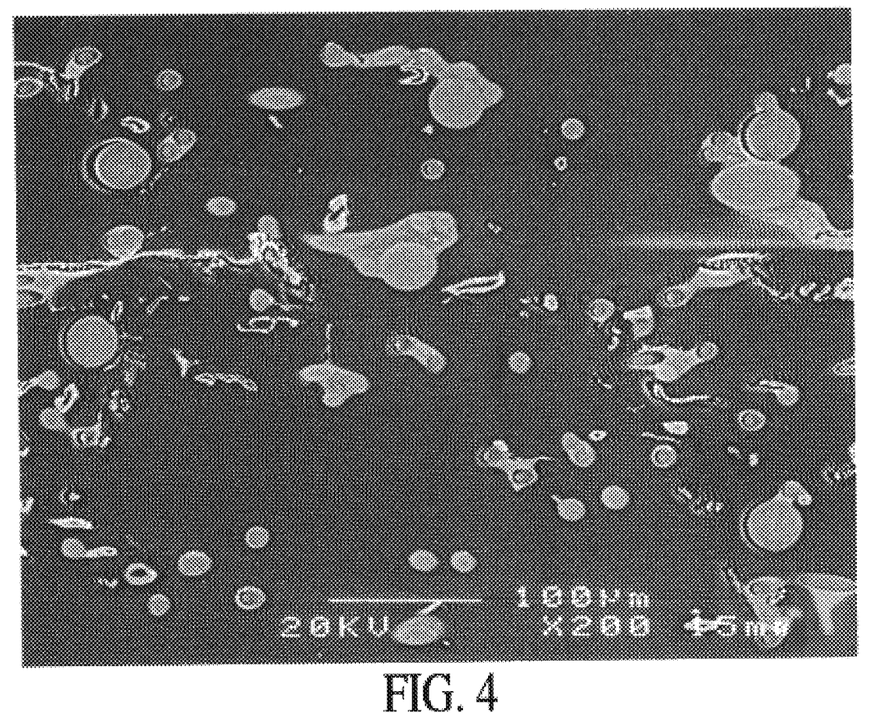
FIG. 4 is a backscattered electron micrograph at 250× magnification of the Z-direction of Example 3—Product 2 filtration fabric, which shows the various fibrous components bonding throughout the sheet.

A generalized wet laid forming process for producing the filtration fabrics of the invention is illustrated in FIG. 1. The wet laid forming process is similar to the process described in U.S. Pat. No. 4,973,382, the disclosure of which is incorporated herein by reference. The wet laid process begins with a stock preparation to make an evenly dispersed mixture of the fibers. The polymeric fibers are opened (separated) and dispersed with the pulp fibers in mix tank 10. Dispersion of the polymeric fibers can be aided by chemical addition of surfactants and/or viscosity modifiers to promote and maintain fiber separation. Wetting agents can also be employed to facilitate dispersion of the hydrophobic fibers and to make them hydrophilic. The mix tank 10 is equipped with an agitator which provides the shear energy required to effect good fiber separation and dispersion throughout the mix volume.

The pulp fibers are opened separately and added to the mix tank 10. Typically, wood fiber is received in sheet form called dry lap or in dry bale form. These sheets and bales are broken up in a slurry tank fitted with a rotor, then the wood fiber slurry is passed through a deflaker, which provides a mechanical action analogous to brushing the surface of the fiber to raise fibrillated tiny tendrils. These tendrils provide mechanical entanglement and hydrogen bonding sites for bonding to one another.

The water, chemicals, and fibers are added to the mixing tank 10 in controlled amounts to obtain a desired stock consistency. From an operational point of view, thicker stock consistencies are desirable to minimize preparation time and save on chemical usage. The consistency level should be chosen so that the forming process can be operated at its optimal speed for a particular grade of fabric.

With the completion of the stock preparation, the thick stock furnish is transferred to a holding or surge tank 12, so that the next batch of stock can be prepared. The surge tank 12 is equipped with an agitator to keep the thick stock uniformly mixed. The surge tank 12 meters stock into a web forming machine 14, which may be of the type known as a Fourdrinier or a Rotoformer. The stock is fed to a head box 13 in the forming machine 14 where it is diluted with water to a lower consistency and brought to a forming zone of an endless wire (mesh) 16 moving in the machine direction.

In the forming zone, water from the diluted stock applied to the wire 16 is drawn through the wire, leaving behind the fiber mat or sheet. The drained water is then recirculated through a primary water circuit. The fiber mat is then transferred out of the forming machine 14. A press section may follow the forming machine to remove additional water from the mat as well as consolidate the web.

If a binder is added for stiffening or cobonding the filtration fabric, it is added to the formed web by any one of several methods, including foamed emulsion, gravure roll polymer emulsion, spraying, or padding and nip-pressure binder pick-up. In FIG. 1, first and second padders 17a, b are shown as the binder applicators. The binder is preferably added in an amount of about 2.5% to about 13% of the total weight of the product. Miscellaneous chemicals such as defoamer, surfactants, catalysts and wet strength resin can be added with the binder and the total of these chemicals will preferably range between about 2.5% to about 13.0% of the total weight of the product.

The newly formed sheet is then dried through a drying section, which may include air convection dryers, steam heated dry cans, or radiant heat from infrared heat panels. An infrared unit 18 and two dry can sections 19a, b are shown in FIG. 1. Sufficient heat is applied to remove the water from the mat and melt the polymer with the lower melting point in the bicomponent fiber thereby thermally binding the fibers together. Therefore, in sheath/core fibers only the sheath actually melts, whereas in monocomponent binder fibers the actual component melts. The dried mat passes through a weight sensor section 20, and is then wound by a winder section 21 in continuous roll form. Additional treatment or finishing of the sheet can follow off line. The filter sheet is then used as a base stock fabric for filter socks, tubes, disks or sheets.

The wet laid forming process allows high productivity in manufacturing. Production rates of about 140–330 ft./min. have been obtained for fabrics of 60–100 inches width and 17–110 g/yd$^2$ fabric weight. The desired tensile strength and filtration properties of the fabric are integrally obtained as a result of the wet forming process.

The nonwoven filtration fabrics intended for use as a filter for milk or other food grade liquids are designed to remove gross contaminants such as twigs, grass, soil contaminants and animal wastes, on the surface, and fine, smaller sized contaminants throughout the intricate network of fibers (i.e. depth filtering) contained in the inner segment of the nonwoven substrate.

The following examples are illustrative of wet laid nonwoven filtration fabrics made in accordance with the invention.

A glossary of the fibers and pulps used in the examples follows:

Glossary 15 d×1½" polyester fiber is: Type 108, 15 denier by 1½" polyethylene terephthalate (PET) polyester fiber (KoSa Fibers, Charlotte, N.C.; formally Hoechst-Celanese Fibers Co., Salisbury, N.C.)

1.5 d×½" polyester fiber is: Type 108, 1.5 denier by ½" polyethylene terephthalate (PET) polyester fiber (KoSa Fibers, Charlotte, N.C.; formally Hoechst-Celanese Fibers Co., Salisbury, N.C.)

4DG 10 d×½" polyester fiber is: 4DG 10 denier×½" deep grooved polyester fiber (Eastman Chemical Company, Kingsport, Tenn.)

Cellbond 106 bicomponent fiber is: Cellbond 106 concentric polyethylene sheath/polyester core bicomponent fiber 3 denierx½" (KoSa Fibers, Charlotte, N.C.; formally Hoechst-Celanese Fibers Co., Salisbury, N.C.)

E-9400 polyethylene pulp is: E-9400 Fybrel® polyethylene pulp (Mitsui Petrochemical Industries, Ltd., Tokyo, Japan)

BASF 1040 1.8 d×¼" bicomponent fiber is: BASF Code 1040, 1.8 denierx¼" polyethylene sheath/polyester core bicomponent fiber (BASF, Charlotte, N.C.)

Kanebo 4080 4.2 d×10 mm bicomponent fiber is: Kanebo 4.2 denierx10 mm polyester sheath/polyester core bicomponent fiber (Kanebo, Osaka, Japan)

NHB405 high bulk pulp is: NHB405 formaldehyde free, FDA approved, mechanically and chemically modified, bleached kraft southern pine wood pulp (Weyerhaeuser Paper Company, New Bern, N.C.). When added to a standard product this pulp will increase bulk (caliper/thickness), porosity, absorbency, and will enhance the overall web formation.

HBA high bulk pulp is: HBA high bulk pulp (Weyerhaeuser Paper Company, New Bern, N.C.). HBA high bulk pulp is similar to NHB405 high bulk pulp, but HBA contains formaldehyde. A nonwoven incorporating either the formaldehyde-free NHB405 or the formaldehyde containing HBA would have similar properties in the context of the present invention.

Viscokraft® hardwood pulp is: Viscokraft® bright alpha hardwood pulp (International Paper Co., Purchase, N.Y.)

Hercules 441 2.2 d bicomponent fiber is: Hercules Type 441, 2.2 denier by ¾" polyethylene sheath/polypropylene core bicomponent fiber (Formerly, Hercules Inc., Now: Fiber Visions®, Covington, Ga.)

Hercules 432 2.2 d bicomponent fiber is: Hercules Type 432, 2.2 denier by ¾" polyethylene sheath/polypropylene core bicomponent fiber (Formerly, Hercules Inc., Now: Fiber Visions®, Covington, Ga.)

Hercules 432 12 d bicomponent fiber is: Hercules Type 432, 12 denier by 1" polyethylene sheath/polypropylene core bicomponent fiber (Formerly, Hercules Inc., Now: Fiber Visions®, Covington, Ga.)

Hercules 430 2.2 d bicomponent fiber is: Hercules Type 430, 2.2 denier by ¾" polyethylene sheath/polypropylene core bicomponent fiber (Formerly, Hercules Inc., Now: Fiber Visions®, Covington, Ga.)

Hercules 430 12 d bicomponent fiber is: Hercules Type 430, 12 denier by 1" polyethylene sheath/polypropylene core bicomponent (Formerly, Hercules Inc., Now: Fiber Visions®, Covington, Ga.)

KV140 binder fiber is: EMS Grilon KV140, 4.2 denierx6 mm copolyamide binder fiber (EMS—American Grilon, Inc., Sumter, S.C.)

N720 bicomponent fiber is: Type N720H 2 denierx5 mm concentric polyester sheath/polyester core bicomponent fiber (Kuraray Co., Ltd., Osaka, Japan)

Polyvinyl alcohol fiber is: Kuralon Type VPB 105-2, 1 denierx4 mm polyvinyl alcohol fiber (Kuraray Co., Ltd., Osaka, Japan)

Danaklon bicomponent fiber is: Danaklon 65/35 AL Special-CP 1.5 denier (1.7 dtex)×6 mm polyethylene sheath/polypropylene core bicomponent fiber (The polyethylene sheath comprises 65% of the denier and the polypropylene core comprises 35% of the denier.) (Formerly: Danaklon, Varda, Denmark. Now: Fiber Visions®, Varda, Denmark.)

Type 201—Merge 2701 bicomponent fiber is: Type 201 Merge 2701 2 denierx½" FDA approved concentric polyester sheath/polyester core bicomponent binder fiber (Fiber Innovation Technology, Johnson City, Tenn.)

Type 201—Merge 2430 bicomponent fiber is: Type 201 Merge 2430 15 denierx1½" FDA approved concentric polyester sheath/polyester core bicomponent binder fiber (Fiber Innovation Technology, Johnson City, Tenn.)

EXAMPLE 1

(Product 1)

50.0% 2.2 denier by ¾" polyethylene/polypropylene sheath/core bicomponent fiber (Type 441, Hercules Inc., Now: Fiber Visions®, Covington, Ga.)

32.0% 15 denier by 1½" polyester fiber (Type 108, KoSa Fibers, Charlotte, N.C.; formally Hoechst-Celanese Fibers Co., Salisbury, N.C.)

12.0% Viscokraft® bright alpha hardwood pulp (International Paper Co., Purchase, N.Y.)

3.0% chemically treated softwood pulp (Type NHB405, Weyerhaeuser Paper Co., New Bern, N.C.)

3.0% 1 denier by 4 mm polyvinyl alcohol fiber (Type VPB 105-2, Kuraray Co., Ltd., Osaka, Japan)

0.5% to 6.0% (percentage calculated based on the total dry weight of the final fabric) Freesol® OT-75 rewetting surfactant—sodium dioctyl sulfosuccinate in a mixture of ethanol and water (BF Goodrich, formally Freedom Textile, Charlotte, N.C.) is added to the fiber slurry to obtain the required surface wet out. A preferred surface wet out for filtration fabrics of this invention is about 0.5 seconds to 2.0 seconds. Wet out is a measure of the time required for one drop, from an eye dropper containing distilled water, to be absorbed into an unbacked 9" square filtration fabric sample. The fabric sample is cut with a die cutting apparatus. A clamped sample is used which is laid flat on a countertop. A timer is started the instant the drop of water is placed on the material and stopped when the drop is completely absorbed. The time for complete absorption is recorded to the nearest tenth of a second. This test is repeated three times and the test averaged. Wet out can also be referred to as wettability or the water drop test.

Trial production runs of this fabric were conducted on a wet lay pilot and commercial lines. The pilot line is a smaller scale version of a commercial line utilizing the previously described wet laid process, except that the pilot line has a rotoformer forming zone while the commercial line has an inclined wire. The filtration fabrics of the invention can be run interchangeably on either type of forming zone.

The filtration fabric of this example can be converted into disk filters. This fabric cannot be converted into tubes and socks on some equipment since this fabric has a soft hand.

EXAMPLE 2

(Alternate Product 1)

51.5% 2.2 denier by ¾" polyethylene/polypropylene sheath/core bicomponent fiber (Type 441, formerly Hercules Inc., now Fabric Visions®, Covington, Ga.)

33.5% 15 denier by 1½" polyester fiber (Type 108, KoSa Fibers, Charlotte, N.C.; formally Hoechst-Celanese Fibers Co., Salisbury, N.C.)

12.0% Viscokraft® bright alpha hardwood pulp (International Paper Co., Purchase, N.Y.)

3.0% chemically treated softwood pulp (Type NHB405, Weyerhaeuser Paper Co., New Bern, N.C.)

The filtration fabric of this example is convertible into disk, tube or sock filters on some converting equipment and only disk filters on other equipment due to its soft hand.

EXAMPLE 3

(Product 2)

50.0% 2 denier by 5 mm polyester/polyester concentric sheath/core bicomponent fiber (Type N720H, Kuraray Co., Ltd., Osaka, Japan)

25.0% 15 denier by 1½" polyester fiber (Type 108, KoSa Fibers, Charlotte, N.C.; formally Hoechst-Celanese Fibers Co., Salisbury, N.C.)

17.0% Viscokraft® bright alpha hardwood pulp (International Paper Co., Purchase, N.Y.)

8.0% chemically treated softwood pulp (Type NHB405, Weyerhaeuser Paper Co., New Bern, N.C.)

Trial production runs of this fabric were conducted on International Paper's pilot line at their Corporate Research Center (Tuxedo, N.Y.) at three different basis weights: 2.5 oz/yd² (Fabric A), 2.2 oz/yd² (Fabric B) and 1.9 oz/yd² (Fabric C). The filtration fabrics of this example can be converted into disk, tube or sock filters.

The physical properties of the three basic weight fabrics of example 3 were characterized as follows:

The physical properties of the three basic weight fabrics of example 3 were characterized as follows:

|  | [Fabric A] | [Fabric B] | [Fabric C] |
|---|---|---|---|
| BASIS WEIGHT(oz/yd²) | 2.5 | 2.2 | 1.9 |
| CALIPER (mils) (1 mil = 0.001 in = 0.254 mm) | 21.3 | 19.3 | 17.5 |
| AIR PERM (cfm/ft²) | 198.0 | 222.0 | 261.0 |
| WET TENSILE (lbs/in, machine direction) | 10.8 | 9.3 | 7.9 |
| WET TENSILE (lbs/in, cross direction) | 8.7 | 7.5 | 7.0 |
| MULLEN BURST TEST, WET (psi) | 67.1 | 52.7 | 47.6 |
| FLOW RATE (sec) | 22.2 | 22.6 | 22.7 |
| SEDIMENT RETENTION (%) | 87.3 | 85.9 | 86.4 |
| REPEAT INSULT (%) | 46.9 | 50.1 | 47.3 |
| WET OUT (sec) | 0.22 | 0.21 | 0.52 |
| EXTRACTABLES(%)(212° F.) | 0.56 | 0.62 | 0.62 |

Tensile Strength Test

In the wet tensile strength tests reported above, a constantly increasing load is applied longitudinally to a fabric specimen until the point of rupture. The tensile strength (breaking load value) is the force per unit area required to rupture the filtration fabric specimen. 1.0 inch by 10.0-inch machine and cross direction specimens are cut, using a die cutting apparatus, in each of five locations in the cross direction.

The test is conducted with an Instron Model 1011 tensile (strength) tester (Instron Corp., Canton, Mass.) with a 100-lb. load cell and 1-inch by 1 inch jaw faces. The Instron Model 1011 instrument is set up with a crosshead speed, gauge length and load range appropriate for the grade of fabric being tested according to the methods of those skilled in the field.

Filtration fabric specimens are wetted with either distilled water or a solution of distilled water and 0.1% of sodium dioctyl sulfosuccinate in a mixture of ethanol and water. The latter is a very good rewetting surfactant. This rewetting surfactant is preferred for fabrics that do not wet out readily.

The specimen is inserted, centered, and closed into the top and bottom jaws. The crosshead controls are operated to break the filtration fabric specimen according to the machine's instructions. The peak load results are read to the nearest 0.1-lb from the digital display readout. (See INDA IST 110.1-92 and ASTM D76, 1117).

Flow Rate/Sediment Retention Test

For the flow rate and sediment retention tests reported in the table above, 6.5 inch diameter filtration fabric samples are cut, using a die cutting apparatus, in each of five locations in the cross direction. The samples are conditioned in a 100° F. oven for one minute and are pre-weighed to the nearest 0.01 g. For the purposes of this test, "Flow Rate" is defined as the time required for 5.0 gallons of water to pass through the fabric and "Sediment Retention" is defined as the percentage of sediment retained in the fabric.

After conditioning, the filtration fabrics are placed on the bottom plate of a flow/retention apparatus. The flow/retention apparatus consists of the following items:

1. Stainless steel holding tank, equipped with buoyant level indicator and overflow, holding 5.0 gallons of water;
2. Discharge pipe of 3.0 inch outer diameter, with 3.0 inch ball or butterfly valve to discharge water held in tank into strainer containing filtration fabric sample;
3. Strainer—12.0 inch diameter by 14.0 inch deep, with a narrow bottom neck, 6-inch diameter by 2¾ inch height;
4. Bottom plate-stainless steel, resting on bottom of strainer and welded all around (plate is 60 inch diameter with 415 holes, each $\frac{11}{64}$ inch diameter, for a total open area of 9.6 in² (31.4% open area));
5. Dome strainer—7½ inch height, with a bottom ring 6 inch diameter, 4 inch central opening (ring holds the specimen down). Above and parallel to the ring is a solid plate, 6½ inch diameter and 3½ inch from the bottom ring. 4×1 inch long part threaded locking threads lock the dome strainer to four reverse half-threads, to secure the specimen to the bottom plate. Before running a test, the water is allowed to run for 3 to 4 minutes. The temperature of the water is tested and adjusted to 88–92° F.

Once the sample filtration fabric is placed on the bottom plate, the dome strainer is secured in place over the sample. 5.0 g of "sediment" (Alundum aluminum oxide powder filtrate 240 grit Saint-Gobain/Norton Industrial Ceramics Corporation, Worcester, Mass.) is placed on the dome strainer above the sample. A stopwatch is started once the valve of the water tank is opened and water begins filling the strainer. The stopwatch is stopped as soon as the water level is even with the top of the strainer dome. The time is recorded to the nearest 0.01 seconds.

Once the flow rate test is completed, the filtration fabric sample is used for the sediment retention calculation. The sample is carefully removed, retaining all of the sediment on the disk. The disk is folded into quarter disks and secured with a paper clip, without losing any sediment. The folded disk is transferred to an oven and dried for 20 minutes at 300° F., assuring that all of the water has been removed. Drying times may vary slightly. The sample is weighed when it is completely dry. The percentage retention is calculated as follows:

$$\% \text{ Retention} = \frac{(\text{Dry weight with sediment} - \text{Original weight without sediment})}{\text{Weight with sediment added } (5.00 \text{ g})} \times 100$$

The sediment retention is recorded to the nearest 0.01%.

Repeat Insult Test

The repeat insult test reported in the table above is used to measure the final flow rate time which is expected when a filtration fabric is exposed to the repeated "insult" of a premeasured amounts of "contamination". Flow time is the number of seconds required for five gallons of warm water (85 to 90° F.) to flow through a filtration fabric sample.

The filtration fabric sample is die cut as described above for the flow rate/sediment retention test. The specimen being tested is clamped to a stainless funnel-type apparatus commonly used to filter milk and is well known to those in the filed. Two grams of standard size grit (Alundum aluminum oxide powder filtrate 940 grit Saint-Gobain/Norton Industrial Ceramics Corporation, Worcester, Mass.) is placed on the sample to simulate contamination in milk. Five gallons of warm water are dropped from a holding tank onto the sample by opening the side water supply valve and filling the tank until overflow occurs. Overflow ensures that 5 gallons is in the holding tank. The side valve is then closed. Next, the bottom valve is opened and all of the water is allowed to drain out of the holding tank. The bottom is valve is then closed. This procedure is repeated for a total five times at which time the filtration fabric sample has been exposed to 10 grams of 940 grit. The time it takes for the final five gallons to drain after the bottom valve is opened is measured and is recorded as the value for the repeat insult test.

Water Extractives ("Extractables") Test

The extractables test reported in the table above (comparing the three fabric weights of the Example 3 filtration fabric) and elsewhere in this application, determines the amount of water extractable material in milk filters. The test is based on U.S. Food and Drug Administration Regulation 177.2260—"Filters, Resin-bonded."

A 6.5-inch diameter specimen, weighing between 8.0 and 10.0 grams, is cut from a full width sample of the filtration fabric to be tested. No conditioning of the fabric is necessary. The specimen is oven-dried at 82° C. (180° F.) for 2–3 minutes and then placed in a desiccator for 20 minutes. The specimen is removed from the desiccator and immediately weighed to the nearest 0.0001 gram. 600–650 ml of distilled water in a 900 ml Pyrex beaker is heated on a hot plate to boiling, 100° C. (212° F.). Using tongs, the specimen is placed in boiling water for exactly 2 hours, stirring occasionally. The specimen is removed from the water and placed in drying oven at 82° C. (180° F.) for a minimum of 20 minutes or until completely dry. The specimen is next placed in the desiccator for 20 minutes. The specimen is removed from the desiccator and immediately weighed to the nearest 0.0001 gram. The percentage of extractables is calculated as follows:

$$\% \text{ extractables} = \frac{(\text{original specimen weight} - \text{final specimen weight})}{\text{original speciment weight}} \times 100$$

The physical characteristics of the 2.20 oz/yd² basis weight filtration fabric of Example 3 was also compared to the filtration fabric of Example 1 and to a filtration fabric according to Kinn et al., U.S. Pat. No. 4,973,382. Minor adjustments to the composition of the Kinn et al. fabric are made depending on the wet laid commercial line employed, which are referenced as Wet Former 1 and 2 in the 2 in the chart below. The resulting fabrics have the same physical characteristics.

| Filtration Fabric according to Kinn et al. U.S. Pat. No. 4,973,382 | | |
|---|---|---|
| | Wet Former 1 | Wet Former 2 |
| Basis Weight | 57 lbs/r | 57 lbs/r |
| 15 d by 1 ½" polyester fiber Type 108 | 52% | 50% |
| 1.5 d by ½" polyester fiber Type 108 | 26% | 28.9% |
| Viscokraft ® bright alpha hardwood pulp | 22% | 21.1% |
| Percent Binder (based on fabric weight) | 21.4% | 19.7% |

Freesol® OT-75 rewetting surfactant is not added to the fiber slurry. Fiber percentages are based on just the furnish portion of the web. The binder percentage is based on the total weight of the fabric.

The results of this physical comparison are as follows:

| | U.S. Pat. No. 4,973,382 | Example 1 | Example 3 |
|---|---|---|---|
| Basis Weight (oz/yd²) | 2.66 | 1.96 | 2.2 |
| Caliper (mils) | 24.0 | 22.9 | 19.3 |
| Air Perm (cfm/ft²) | 313.0 | 428.0 | 222.0 |
| Wet Burst (psi) | 96.9 | 63.1 | 52.7 |
| MD Wet Strip Tensile(lbs/in) | 22.5 | 14.0 | 9.3 |
| CD Wet Strip Tensile (lbs/in) | 11.4 | 3.1 | 7.5 |
| Water Drop (sec) | 1.12 | 4.5 | 0.21 |
| Flow Rate (sec) | 26.8 | 19.5 | 22.6 |
| Sediment Retention (%) | 74.2 | 75.3 | 85.9 |
| 100° F. Extractables (%) | | | 0.32 |
| 212° F. Extractables (%) | 0.91 | 1.77 | 0.62 |

EXAMPLE 4
(Product 3)

| | |
|---|---|
| 50.0% | 2.2 denier by ¾" polyethylene/polypropylene sheath/core bicomponent fiber (Type 441, Formerly: Hercules Inc., Now: Fiber Visions ® Covington, Ga.) |
| 32.0% | 15 denier by 1½" polyester fiber (Type 108, KoSa Fibers, Charlotte, NC; formally Hoechst-Celanese Fibers Co., Salisbury, NC) |
| 12.0% | Viscokraft ® bright alpha hardwood pulp (International Paper Co., Purchase, NY) |
| 3.0% | chemically treated softwood pulp (Type NHB405, Weyerhaeuser Paper Co., New Bern, N.C.) |
| 3.0% | 1 denier by 4 mm polyvinyl alcohol fiber (Type 105-2 made by Kuraray Co., Ltd., Osaka, Japan) |

2.5 to 9.0% Acronol® S-714 formaldehyde-free, latex binder (BASF Corp., Charlotte, N.C.) is added based on the total dry weight of the filtration fabric. Freesol® OT-75 rewetting surfactant is added to the fiber slurry at the level of 0.5% to 6% of the total dry fiber weight to obtain the desired surface wet out.

Various levels of binder were added to the filtration fabric of Example 4 to stiffen the product enough to convert it into tube and sock filters. The filtration fabric of this example can be converted into disk filters without the addition of binder.

A laboratory version of this filtration fabric was made using 5% latex binder. The filtration fabric of this example could be converted into disk, tube or sock filters.

This filtration fabric was physically characterized as follows:

| | |
|---|---|
| Basis Weight (lb/ream [r]) | 46.98 |
| Binder Add On Weight (lb/r) | 2.55 |
| Total Basis Weight (lb/r) | 49.53 |
| Caliper (mils) | 23.9 |
| Air Perm (cfm/sqft) | 395.0 |
| MD Wet Strip Tensile (lbs/in) | 21.2 |
| Water Drop (sec) | 0.87 |
| Flow Rate (sec) | 16.3 |
| Sediment Retention (%) | 70.3 |
| 212° F. Extractables (%) | 1.67 |

EXAMPLE 5

| | |
|---|---|
| 50.0% | 2 denier by ½" polyester/polyester FDA-approved concentric sheath/core bicomponent fiber (Type 201, Merge 2701, Fiber Innovation Technology, Johnson City, TN) |
| 28.0% | 15 denier by 1½" polyester fiber (Type 108, KoSa Fibers, Charlotte, NC; formally Hoechst-Celanese Fibers Co., salisbury, NC) |
| 17.0% | Viscokraft ® bright alpha hardwood pulp (International Paper Co., Purchase, NY) |
| 5.0% | Chemically treated softwood pulp (Type NHB405, Weyerhaeuser Paper Company, New Bern, NC) |

A trial production runs of this fabric was conducted on a wet lay pilot line with a targeted basis weight of 2.15 oz/yd$^2$. The filtration fabric produced can be converted into disk filters. As the steam pressure was increased from 40 to 60 psi the hand of the product stiffened and the burst strength increased. If the steam pressure could be further increased, this fabric could possibly be utilized for sock and tube applications. The physical characteristics for this example are summarized in the chart following Example 6.

EXAMPLE 6

| | |
|---|---|
| 50.0% | 2 denier x ½" FDA approved polyester/polyester concentric sheath/core bicomponent fiber (Type 201, Merge 2701, Fiber Innovation Technology, Johnson City, TN) |
| 28.0% | 15 denier by 1½" polyester fiber (Type 108, KoSa Fibers, Charlotte, NC; formally Hoechst-Celanese Fibers Co., Salisbury, NC) |
| 17.0% | Viscokraft ® bright alpha hardwood pulp International Paper Co., Purchase, NY) |
| 5.0% | chemically treated softwood pulp (Type NHB405, Weyerhaeuser Paper Co., New Bern, NC) |

4.35% Acronol® S-728 butyl acrylate/styrene copolymer dispersion latex binder (BASF Corporation, Charlotte, N.C.) is added based on the total dry weight of the filtration fabric. 0.09% Freesol® OT-75 sodium dioctyl sulfosuccinate in a mixture of ethanol and water (BF Goodrich, formally Freedom Textile, Charlotte, N.C.) is added with the binder based on the total dry weight of the fabric.

A trial and commercial run of this fabric has been conducted on commercial wet lines. The stiffness of the Example 6 commercial trial was increased substantially over the pilot trial of Example 6 by increasing the steam pressure from 60 psi to 100 psi which increased the drying temperature from 290 to 330° F. (143.3 to 165.5° C.). The filtration fabric produced can be converted into disk, tube and sock filters. The physical characteristics for this example and the previous example are summarized as follows:

| | Example 5 | Example 6 Trial Run Commercial Line | Example 6 Commercial Run Commercial Line |
|---|---|---|---|
| Basis Weight (oz/yd$^2$) | 2.15 | 2.15 | 2.15 |
| Caliper (mils) | 25.0 | 4.0 | 30.0 |
| Air Perm (cfm/ft$^2$) | 413.0 | 416.0 | 470.0 |
| Wet Burst (psi) | 29.0 | 40.0 | 55.0 |
| MD Wet Strip Tensile (lbs/in) | 10.4 | 12.7 | 6.0 |
| CD Wet Strip Tensile (lbs/in) | 3.4 | 4.5 | 4.4 |
| Water Drop (sec) | 0.32 | 0.56 | 0.44 |
| Flow Rate (sec) | 14.6 | 15.6 | 11.6 |
| Sediment Retention (%) | 69.0 | 65.0 | 62.0 |
| 212° F. Extractables (%) | 0.0 | 0.0 | 0.0 |

EXAMPLE 7

| | |
|---|---|
| 50.0% | 2 denier by ½" FDA approved polyester/polyester concentric sheath/core bicomponent fiber (Type 201, Merge 2701, Fiber Innovation Technology, Johnson City, TN) |
| 20.0% | 15 denier by 1½" FDA approved polyester/polyester concentric sheath/core bicomponent fiber (Type 201, Merge 2430, Fiber Innovation Technology, Johnson City, TN) |
| 25.0% | Viscokraft ® bright alpha hardwood pulp (International Paper Co., Purchase, NY) |
| 5.0% | Chemically treated softwood pulp (Type NHB405, Weyerhaeuser Paper Company, New Bern, NC) |

4.35% Acronol® S-728 butyl acrylate/styrene copolymer dispersion latex binder (BASF Corporation, Charlotte, N.C.) is added based on the total dry weight of the filtration fabric. 0.09% Freesol® OT-75 sodium dioctyl sulfosuccinate in a mixture of ethanol and water (BF Goodrich, formally Freedom Textile, Charlotte, N.C.) is added with the binder based on the total dry weight of the fabric. The physical characteristics for this example are summarized in the chart following Example 8.

EXAMPLE 8

| | |
|---|---|
| 50.0% | 2 denier by ½" FDA approved polyester/polyester concentric sheath/core bicomponent fiber (Type 201, Merge 2701, Fiber Innovation Technology, Johnson City, TN) |
| 20.0% | 15 denier by 1½" FDA approved polyester/polyester concentric sheath/core bicomponent fiber (Type 201, Merge 2430, Fiber Innovation Technology, Johnson City, TN) |
| 25.0% | Viscokraft ® bright alpha hardwood pulp (International Paper Co., Purchase, NY) |
| 5.0% | Chemically treated softwood pulp (Type NHB405, Weyerhaeuser Paper Company, New Bern, NC) |

4.35% Acronol® S-728 butyl acrylate/styrene copolymer dispersion latex binder (BASF Corporation, Charlotte, N.C.) is added based on the total dry weight of the filtration fabric.

0.09% Freesol® OT-75 sodium dioctyl sulfosuccinate in a mixture of ethanol and water (BF Goodrich, formally Freedom Textile, Charlotte, N.C.) is added with the binder based on the total dry weight of the fabric. The physical characteristics for this example are summarized as follows:

|  | Example 7 | Example 8 |
|---|---|---|
| Basis Weight (oz/yd$^2$) | 1.97 | 2.1 |
| Caliper (mils) | 30.5 | 32 |
| Air Perm (cfm/ft$^2$) | 459 | 365 |
| Wet Burst (psi) | 39.0 | 45.7 |
| MD Wet Strip Tensile (lbs/in) | 13.9 | 9.4 |
| Water Drop (sec) | 0.6 | 0.6 |
| Flow Rate (sec) | 11.3 | 11.2 |
| Sediment Retention (%) | 79 | 83.5 |
| 212° F. Extractables (%) | 0 | 0 |

Pilot line trials of these examples were conducted during the second quarter of 1999. Example 8 fabric yielded an improved formation and filter efficiency over Example 6. The flow of both examples was similar to the commercial trial of Example 6 with a substantial improvement in sediment retention. Control valve malfunction on the steam pressure to the dryer cam prevented the attainment of a higher wet burst strength and the same stiffness of Example 6.

EXAMPLE 9

Other filtration fabric handsheets were made and tested as described in the following examples.

A dozen handsheets of the control (first iteration) and three handsheets of alternate furnishes were made. The control iteration was dried in the oven at 325° F. (162.8° C.) for 3 minutes. The third iteration was dried on the surface dryer at 325° F.(162.8° C.) for 3 minutes. The second, fourth and fifth iteration were dried on the surface dryer at 340° F. (171.1° C.) for 3 minutes.

The control iteration is a laboratory static version of the dynamic Wet Former 1 & 2 product filtration fabric according to Kinn et al., U.S. Pat. No. 4,973,382 described above.

| CONTROL 1ST ITERATION | 2ND ITERATION |
|---|---|
| FURNISH 43 lb/r (2.06 oz/yd$^2$) | FURNISH 50 lb/r (2.4 oz/yd$^2$) |
| 50% 15d × 1.5" polyester fiber | 40% CELLBOND 106 bicomponent fiber |
| 25% 1.5d × 0.5" polyester fiber | 35% 4DG 10d × 1/2" polyester fiber |
| 25% VISCOKRAFT ® hardwood pulp | 25% VISCOKRAFT ® hardwood pulp |
| ADD ON 6 lb/r OF FOAM | |
| ADD ON 8 lb/r OF SATURATION | |
| 3RD ITERATION | 4TH ITERATION |
| FURNISH 50 lb/r (2.4 oz/yd$^2$) | FURNISH 50 lb/r (2.4 oz/yd$^2$) |
| 40% N720 bicomponent fiber | 40% CELLBOND 106 bicomponent fiber |
| 35% 15d × 1.5" polyester fiber | 35% 15d × 1.5" polyester fiber |
| 25% VISCOKRAFT ® hardwood pulp | 25% VISCOKRAFT ® hardwood pulp |
| 5TH ITERATION | |
| FURNISH 50 lb/r (2.4 oz/yd$^2$) | |
| 40% CELLBOND 106 bicomponent fiber | |
| 35% 15d × 1.5" polyester fiber | |
| 25% E-9400 polyethylene pulp | |

Furnish refers to all the fibers and pulp used to make the nonwoven product. Iterations 2 to 5 were not treated with foam or saturation.

A solution of foam and saturation was added to the control iteration in the laboratory with the laboratory padder. On the commercial line, a preferred method of application is to mix air with the latex binder to create a foam which is forced into the web as the fabric passes between a gapped set of rollers. The saturation can also be added to the filtration fabric with padders on the commercial line.

FOAM

| Batch size | 985 gms |
|---|---|
| Water | 652 gms |
| Citric acid | 0.4 gms |
| Ammonia | 3.0 gms |
| Decerosol OT-75 ®* rewetting surfactant | 1.27 gms in hot water (100–180° F.) |
| Aerotex M-3 ®** melamine formaldehyde resin, wet strength | 7.7 gms |
| Hycar 26421*** latex binder | 308.0 gms |
| Solids 15.86% | |

SATURATION

| Batch Size | 925 gms |
|---|---|
| Water | 793 gms |
| Citric acid | 0.15 gms |
| Ammonia | 1.3 gms |
| NaCl | 0.27 gms |
| Decerosol OT-75 ® rewetting surfactant | 0.47 gms in hot water (100–180° F.) |
| Aerotex M-3 ® melamine formaldehyde resin | 2.8 gms |
| Hycar 26421 latex binder | 114.0 gms |
| AF-72 defoamer**** | 0.14 gms |
| Solids 6.35% | |

*Formally of Cytec Industries. Currently produced by Freedom Textile Chemicals, Philadelphia, PA, as Freesol OT-75 ®. Freedom Textile was recently purchased by B.F. Goodrich Chemical Co., Cleveland, OH.
**Freedom Textile Chemicals, Philadelphia, recently purchase by B.F. Goodrich, Cleveland, OH.
***B.F. Goodrich, Cleveland, OH.
****was formerly produced by GE Silicones, Waterford, NY. A replacement product is AF9030 defoamer, GE Silicones, Waterford, NY.

Cellbond 106 bicomponent (Hoechst/Celanese Fibers Co., Charlotte, N.C.) is a concentric sheath/core fiber (polyethylene sheath and polyester core). N720 bicomponent fiber (Kuraray Co., Ltd., Osaka, Japan) is a concentric sheath/core fiber (polyester sheath and core); E-9400 is a polyethylene pulp (Mitsui Petrochemical Industries, Ltd., Tokyo, Japan). 4DG is a deep grooved polyester fiber (Eastman Chemical Company, Kingsport, Tenn.). Type 108 1.5 d by ½" and Type 108 15 d by 1½" are polyester fibers (Hoechst/Celanese, Salisbury, N.C.).

The physical characteristics of the filtration fabrics of this example were evaluated and the results are shown in Table 1. Iteration 2 would not release from the forming wire of the sheet mold, so it could not be evaluated. In earlier studies of the 4DG polyethylene fiber together with some polyvinyl alcohol fiber (VPB 105-2, Kuraray Co., Ltd., Osaka, Japan), the filtration fabric released from the mold. 3% polyvinyl alcohol fibers (based on dry weight of all the fibers) was added to the furnish. Iterations 2, 4 and 5 were hydrophobic.

The wet burst and tensile strength of iteration 4 was too low and iteration 4 and 5 adhered slightly to the Teflon® fabric of the surface dryer. Adding the polyester pulp in iteration 5 for some of the hardwood pulp of iteration 4 increased the wet burst, wet tensile strength and flow rate but lowered the sediment retention. Higher flow rate is a positive attribute of a milk filtration fabric but a lower sediment retention is not. A slight reduction in sediment retention may be acceptable if a higher flow rate is achieved. The best filtration fabric would have a high flow rate and a high sediment retention.

The hand sheets in this example and Examples 6–15 were produced using a Williams Standard Pulp Testing Apparatus (Williams Apparatus Co., Watertown, N.Y.). All of the samples were dried on an Emerson Speed Dryer (Emerson Apparatus Co., Portland, Me.) laboratory surface dryer to simulate the commercial drying process.

EXAMPLE 10

Five handsheets of the alternate furnishes listed below were made. All iterations were dried on the surface dryer at 325° F. (162.8° C.) for 1.5 minutes on each side. The saturation iteration was dried in the oven for 3 minutes at 325° F.

| 6TH ITERATION | 7TH ITERATION |
|---|---|
| FURNISH 50 lb/r (2.4 oz/yd$^2$) | FURNISH 50 lb/r (2.4 oz/yd$^2$) |
| 40% N720 bicomponent fiber | 50% N720 bicomponent fiber |
| 35% 15d × 1/2" polyester fiber | 25% 15d × 1/2" polyester fiber |
| 22% VISCOKRAFT ® hardwood pulp | 17% VISCOKRAFT ® hardwood pulp |
| 3% Polyvinyl alcohol fiber | 8% NHB405 high bulk pulp |
| 8TH ITERATION | 9TH ITERATION |
| FURNISH 50 lb/r (2.4 oz/yd$^2$) | FURNISH 46 lb/r |
| 40% N720 bicomponent fiber | 50% N720 bicomponent fiber |
| 35% 15d × 1/2" polyester fiber | 25% 15d × 1/2" polyester fiber |
| 25% VISCOKRAFT ® hardwood pulp | 17% VISCOKRAFT ® hardwood pulp |
|  | 8% NHB405 high bulk pulp |
|  | SATURATION 4 lb/r |

The polyvinyl alcohol fiber used in all the iterations is Kuralon VPB 105-2 (Kuraray Co. Ltd., Osaka, Japan). NHB405 high bulk fiber (Weyerhaeuser Paper Company, New Bern, N.C.) is a formaldehyde free, FDA approved, mechanically and chemically modified, bleached kraft southern pine wood pulp that, when added to a standard product, will increase bulk (caliper/thickness), porosity, absorbency, and will enhance the overall web formation.

In this example, a polyvinyl alcohol fiber was added in the sixth iteration, and a higher percentage of N720 polyester/polyester bicomponent fiber as well as a high bulk pulp was used in the seventh iteration. The eighth iteration is the same as the third iteration described in Example 5. The ninth iteration has a lighter furnish with 8% level of the liquid binder formulation (the saturation formulation described in Example 5).

The physical characteristics of the filtration fabrics of this example were evaluated and the results are shown in Table 1. The sixth iteration (which adds a polyvinyl alcohol fiber to the third iteration) resulted in a lower wet burst, higher flow rate and higher sediment retention. The ninth iteration is characterized by a good wet tensile and wet burst but it also has a higher flow rate than the control filtration fabric.

The results of measuring the physical characteristics for the above iterations are shown in Table 1.

TABLE 1

EVALUATION OF FILTRATION FABRICS

| Iteration | Caliper (mils) | Air Perm (cfm/sqft) | Wet Burst Strength (psi) | Wet Tensile Strength (lbs/in) | Flow Rate (sec) | Sediment Retention (%) |
|---|---|---|---|---|---|---|
| Control | 31.8 | 252 | 114.5 | 24.5 | 29.0 | 78.7 |
| 3RD | 30.2 | 248 | 62.9 | 8.1 | 24.2 | 87.5 |
| 4TH | 32.1 | 256 | 43.2 | 4.3 | 22.8 | 83.6 |
| 5TH | 24.7 | 331 | 88.3 | 8.7 | 26.1 | 74.9 |
| 6TH | 27.7 | 272 | 57.5 | 9.1 | 27.0 | 93.8 |
| 7TH | 29.0 | 252 | 70.9 | 12.2 | 27.2 | 96.0 |
| 8TH | 26.6 | 246 | 63.8 | 8.9 | 28.1 | 94.2 |
| 9TH | 25.9 | 230 | 80.8 | 15.3 | 30.4 | 93.3 |

EXAMPLE 11

Five handsheets of the alternate furnishes listed below were made. All iterations were dried on the surface dryer at 325° F. (162.8° C.) for 1.5 minutes on each side. The saturation iteration was dried in the oven for 3 minutes at 325° F. The lighter weight fabrics were made by the same process as the heavier fabrics, but a proportionally lesser amount of each component was used. The saturation is the same as that described in Example 5.

| 10TH ITERATION | 11TH ITERATION |
|---|---|
| FURNISH 50 lb/r (2.4 oz/yd$^2$) | FURNISH 50 lb/r (2.4 oz/yd$^2$) |
| 50% N720 bicomponent fiber | 50% N720 bicomponent fiber |
| 25% 15d × 1.5" polyester fiber | 25% 15d × 1.5" polyester fiber |
| 8% VISCOKRAFT ® hardwood pulp | 17% VISCOKRAFT ® hardwood pulp |
| 17% NHB405 high bulk pulp | 8% NHB405 high bulk pulp |
| 12TH ITERATION | 13TH ITERATION |
| FURNISH 40 lb/r | FURNISH 45 lb/r |
| 50% N720 bicomponent fiber | 50% N720 bicomponent fiber |
| 25% 15d × 1.5" polyester fiber | 25% 15d × 1.5" polyester fiber |
| 17% VISCOKRAFT ® hardwood pulp | 17% VISCOKRAFT ® hardwood pulp |
| 8% NHB405 high bulk pulp | 8% NHB405 high bulk pulp |
| 14TH ITERATION | 15TH ITERATION |
| FURNISH 50 lb/r (2.4 oz/yd$^2$) | FURNISH 50 lb/r (2.4 oz/yd$^2$) |
| 50% N720 bicomponent fiber | 40% N720 bicomponent fiber |
| 25% 15d × 1.5" polyester fiber | 35% 15d × 1.5" polyester fiber |
| 17% E-9400 polyethylene pulp | 25% VISCOKRAFT ® hardwood pulp |
| 8% NHB405 high bulk pulp |  |
| 16TH ITERATION | 17TH ITERATION |
| FURNISH 45 lb/r | FURNISH 40 lb/r |
| 40% N720 bicomponent fiber | 40% N720 bicomponent fiber |
| 35% 15d × 1.5" polyester fiber | 35% 15d × 1.5" polyester fiber |
| 25% VISCOKRAFT ® hardwood pulp | 25% VISCOKRAFT ® hardwood pulp |
| 5 lb/r SATURATION | 5 lb/r SATURATION |
| 18TH ITERATION |  |
| FURNISH 35 lb/r |  |
| 40% N720 bicomponent fiber |  |
| 35% 15d × 1.5" polyester fiber |  |
| 25% VISCOKRAFT ® hardwood pulp |  |
| 5 lb/r SATURATION |  |

In this example, iterations 12 and 13 are lighter versions of iteration 11. Iteration 11 is a repeat of iteration 7. The results are not identical, however, because the lab technique with respect to fiber dispersion and web formation was perfected with iteration 10. Thereafter, the lab technique was very repeatable. A higher level of NHB405 high bulk pulp is employed in iteration 10. E-9400 polyethylene pulp is tested again in iteration 14. Iteration 15 is the same as iterations 3 and 8. Iterations 16, 17 and 18 were made to evaluate three basis weight products with a low level of latex binder using the saturation solution described for the control iteration, but at the 5 lb/r level.

The physical characteristics of the filtration fabrics of this example were evaluated and the testing of the control was updated; the results are shown in Table 2. The flow rate and sediment retention remained very similar as the basis weight was decreased (iterations 12 and 13 versus 11), although the wet burst drops slightly. As the levels of NHB405 chemically treated softwood pulp were increased, the wet burst, retention and flow rate dropped and the caliper increased. NHB405 chemically treated softwood pulp adds bulk and it also improves web formation (more uniform distribution of the fibers). The addition of latex binder yielded a lower flow rate (actual times increased) and a higher wet burst in all three iterations (16, 17 and 18).

The E-9400 polyethylene pulp (iteration 14) lowered the sediment retention and increase the wet tensile strength.

EXAMPLE 12

Five handsheets of the alternate furnishes listed below were made. All iterations were dried on the surface dryer at 325° F. (162.8° C.) for 1.5 minutes on each side.

| 19TH ITERATION | 20TH ITERATION |
|---|---|
| FURNISH 50 lb/r (2.4 oz/yd$^2$) | FURNISH 50 lb/r (2.4 oz/yd$^2$) |
| 50% DANAKLON bicomponent fiber | 50% BASF 1040 1.8d × 1/4" bicomponent fiber |
| 25% 15d × 1.5" polyester fiber | 25% 15d × 1.5" polyester fiber |
| 17% VISCOKRAFT ® hardwood pulp | 17% VISCOKRAFT ® hardwood pulp |
| 8% NHB405 high bulk pulp | 8% NHB405 high bulk pulp |

| 21ST ITERATION | |
|---|---|
| FURNISH 50 lb/r (2.4 oz/yd$^2$) | |
| 50% DANAKLON bicomponent fiber | |
| 25% 15d × 1.5" polyester fiber | |
| 12% VISCOKRAFT ® hardwood pulp | |
| 5% E-9400 polyethylene pulp | |
| 8% NHB405 high bulk pulp | |

In this example, a Danaklon bicomponent (a polypropylene core with a polyethylene sheath) was substituted for the N720 sheath/core polyester/polyester bicomponent fiber used in iteration 11 (which is a repeat of iteration 7). The Danaklon bicomponent fiber used in these iterations (Danaklon 65/35 AL Special-CP 1.7 dtex×6 mm) is a sheath/core bicomponent fiber comprised of a polyethylene sheath which comprises 65% of the denier and a polypropylene core which comprises 35% of the denier. The denier of the fiber used was 1.5, which is equivalent to 1.7 dtex. The cut length was 6 mm.

In iteration 19, the use of Danaklon sheath/core polyethylene/polypropylene bicomponent fiber resulted in a lower, though still acceptable, wet burst strength than in iteration 11.

Iteration 21 was an attempt to increase the wet burst strength to that achieved in iteration 11 with a different furnish using Danaklon bicomponent fiber. The wet burst strength of iteration 21 was lower than that of iteration 11.

Iteration 20 substituted a BASF polyethylene sheath/polyester core bicomponent fiber for N720 bicomponent fiber. The results were an unacceptably low wet burst strength and wet tensile strength.

EXAMPLE 13

Five handsheets of the alternate furnishes listed below were made. All iterations were dried on the surface dryer at 325° F. (162.8° C.) for 1.5 minutes on each side.

| 22ND ITERATION | 23RD ITERATION |
|---|---|
| FURNISH 50 lb/r (2.4 oz/yd$^2$) | FURNISH 50 lb/r (2.4 oz/yd$^2$) |
| 60% DANAKLON bicomponent fiber | 50% DANAKLON bicomponent fiber |
| 25% 15d × 1.5" polyester fiber | 25% 15d × 1.5" polyester fiber |
| 5% HBA* high bulk fiber | 10% HBA* high bulk fiber |
| 10% VISCOKRAFT ® hardwood pulp | 15% B-9400 polyethylene pulp |

| 24TH ITERATION | |
|---|---|
| FURNISH 50 lb/r (2.4 oz/yd$^2$) | |
| 50% DANAKLON bicomponent fiber | |
| 25% 15d × 1.5" polyester fiber | |
| 12% VISCOKRAFT ® hardwood pulp | |
| 5% E-9400 polyethylene pulp | |
| 8% HBA* high bulk fiber | |

*HBA is a version of NHB405 high bulk fiber which contains formaldehyde. The two fibers are similar except for this difference. NHB405 was unavailable at the time of these tests. The formaldehyde free version is preferred for filtration fabrics of this invention.

Iterations 22, 23 and 24 furnishes substitute Danaklon bicomponent fiber for N720 bicomponent fiber. The wet burst strength of iterations 22 and 24 was unacceptable, while the wet burst strength of iteration 23 was barely acceptable. The wet burst strength of all three iterations are lower than the wet burst strength of iteration 11.

EXAMPLE 14

Five handsheets of the alternate furnishes listed below were made. All iterations were dried on the surface dryer at 325° F. (162.8° C.) for 1.5 minutes on each side.

| 25TH ITERATION | 26TH ITERATION |
|---|---|
| FURNISH 50 lb/r (2.4 oz/yd$^2$) | FURNISH 50 lb/r (2.4 oz/yd$^2$) |
| 60% CELLBOND 106 bicomponent fiber | 60% DANAKLON bicomponent fiber |
| 25% 15d × 1.5" polyester fiber | 35% 15d × 1.5" polyester fiber |
| 5% NHB405 high bulk pulp | 5% NHB405 high bulk pulp |
| 10% VISCOKRAFT ® hardwood pulp | |

In iteration 25 the level of Cellbond 106 bicomponent fiber was increased by 50%—from 40% of the iteration ingredients in iteration 4 to 60% of the iteration ingredients in iteration 25. The result was a wet burst strength only 10% higher than that in iteration 4.

Iteration 26 was another attempt to achieve the wet burst strength of iteration 11 with Danaklon bicomponent fiber substituted for N720 bicomponent fiber. The wet burst strength is above 50 psi but lower than the wet burst strength of iteration 11.

The results of measuring the physical characteristics for the above iterations are shown in Table 2.

TABLE 2

EVALUATION OF FILTRATION FABRICS

| Iteration | Caliper (mils) | Air Perm (cfm/sqft) | Wet Burst Strength (psi) | Wet Tensile Strength (lbs/in) | Flow Rate (sec) | Sediment Retention (%) |
|---|---|---|---|---|---|---|
| Control | 32.1 | 299 | 104.7 | 19.9 | 24.2 | 84.0 |
| 10TH | 36.4 | 350 | 63.3 | 10.7 | 15.0 | 74.0 |
| 11TH | 33.7 | 312 | 70.4 | 9.6 | 17.7 | 85.0 |
| 12TH | 28.7 | 365 | 58.4 | 7.4 | 16.6 | 85.0 |
| 13TH | 29.5 | 339 | 60.7 | 8.6 | 17.4 | 86.0 |
| 14TH | 23.4 | 284 | 75.4 | 14.2 | 17.5 | 72.3 |

TABLE 2-continued

EVALUATION OF FILTRATION FABRICS

| Iteration | Caliper (mils) | Air Perm (cfm/sqft) | Wet Burst Strength (psi) | Wet Tensile Strength (lbs/in) | Flow Rate (sec) | Sediment Retention (%) |
|---|---|---|---|---|---|---|
| 15TH | 30.6 | 343 | 54.5 | 8.1 | 18.4 | 85.5 |
| 16TH | 24.3 | 226 | 87.7 | 10.9 | 22.0 | 84.3 |
| 17TH | 24.3 | 264 | 72.3 | 10.1 | 21.1 | 86.0 |
| 18TH | 22.6 | 305 | 65.3 | 9.7 | 22.1 | 82.7 |
| 19TH | 33.6 | 274 | 47.7 | 7.3 | 17.7 | 86.8 |
| 20TH | 34.1 | 327 | 19.3 | 1.8 | 17.1 | 87.7 |
| 21ST | 32.9 | 257 | 47.2 | 7.9 | 18.2 | 86.7 |
| 22ND | 32.9 | 277 | 47.7 | 10.3 | 22.9 | 86.5 |
| 23RD | 29.0 | 277 | 49.9 | 10.2 | 22.1 | 83.0 |
| 24TH | 32.6 | 279 | 43.8 | 8.1 | 20.5 | 87.0 |
| 25TH | 34.9 | 389 | 47.9 | 5.1 | 19.5 | 82.2 |
| 26TH | 29.8 | 348 | 59.6 | 11.1 | 23.1 | 82.2 |

EXAMPLE 15

Five handsheets of the alternate furnishes listed below were made. Iteration 27 was dried on the surface dryer at 260° F. (126.7° C.) for 1.5 minutes on each side. Iteration 28 was dried on the surface dryer at 290° F. (143.3° C.) for 1.5 minutes on each side.

| 27TH ITERATION | 28TH ITERATION |
|---|---|
| FURNISH 50 lb/r (2.4 oz/yd$^2$) | FURNISH 50 lb/r (2.4 oz/yd$^2$) |
| 50% HERCULES TYPE 432 2.2d bicomponent fiber | 50% HERCULES TYPE 430 2.2d bicomponent fiber |
| 25% HERCULES TYPE 432 12d* bicomponent fiber | 25% HERCULES TYPE 430 12d bicomponent fiber |
| 17% VISCOKRAFT ® hardwood pulp | 17% VISCOKRAFT ® hardwood pulp |
| 8% NHB405 high bulk pulp | 8% NHB405 high bulk pulp |

In iterations 27 and 28, two different types of Hercules (polyethylene sheath/polypropylene core) bicomponent fibers were evaluated as substitutes for the N720 bicomponent fibers used in iteration 11.

Iteration 27 used Hercules type 432 bicomponent fiber and iteration 28 used Hercules 430 bicomponent fiber. The sheath of the 432 bicomponent fiber melts at 107° C. (224.6° F.), whereas the sheath of the 430 bicomponent fiber melts at 135° C. (275.0° F.)

The 432 bicomponent resulted in higher wet burst strength and wet tensile strength than that of the 430 bicomponent fiber. Both furnishes resulted in a lower wet burst strength than iteration 11. Iterations 27 and 28 also had higher flow rates and lower retention rates than iteration 11.

EXAMPLE 16

Five handsheets of the alternate furnishes listed below were made. The samples were first dried at 200° F. (93.3° C.) for 10 minutes in a forced convection air flow laboratory bench oven (Model LAC 2-12, Despatch Industries, Inc., Minneapolis, Minn.). Samples were then dried on the surface dryer at 260° F. (126.7° C.) for 1.5 minutes on each side. Iteration 30 was not produced.

| 29TH ITERATION | 30th ITERATION |
|---|---|
| FURNISH 50 lb/r (2.4 oz/yd$^2$) | FURNISH 50 lb/r (2.4 oz/yd$^2$) |
| 60% HERCULES TYPE 432 2.2d bicomponent fiber | 60% HERCULES TYPE 430 2.2d bicomponent fiber |
| 20% 15d × 1.5" polyester fiber | 20% 15d × 1.5" polyester fiber |
| 12% VISCOKRAFT ® hardwood pulp | 12% VISCOKRAFT ® hardwood pulp |
| 8% NHB405 high bulk pulp | 8% NHB405 high bulk pulp |

In iteration 29 two different types of Hercules bicomponents were evaluated as substitutes for the N720 bicomponent used in iteration 11.

Iteration 29 had a lower wet burst strength than iteration 11. Iteration 29 also had a higher flow rate and lower retention rate than iteration 11.

EXAMPLE 17

Five handsheets of the alternate furnishes listed below were made. The Samples were first dried at 200° F. (93.3° C.) for 10 minutes in a forced convection air flow laboratory bench oven (Model LAC 2-12, Despatch Industries, Inc., Minneapolis, Minn.). Iteration 31 was dried on the surface dryer at 290° F. (143.3° C.) for 1.5 minutes on each side.

31ST ITERATION
FURNISH 50 lb/r (2.4 oz/yd$^2$)
25% HERCULES TYPE 432 2.2 d bicomponent fiber
50% HERCULES TYPE 432 12 d bicomponent fiber
17% VISCOKRAFT® hardwood pulp
8% NHB405 high bulk pulp In iteration 31 a Hercules bicomponent was evaluated as a substitute for the N720 bicomponent fiber used in iteration 11.

Iteration 31 had a lower wet burst strength than iteration 11. Iteration 31 also had higher flow rate and lower retention rate than iteration 11.

The results of measuring the physical characteristics for the above iterations are shown in Table 3.

TABLE 3

EVALUATION OF FILTRATION FABRICS

| Iteration | Caliper (mils) | Air Perm (cfm/sqft) | Wet Burst Strength (psi) | Wet Tensile Strength (lbs/in) | Flow Rate (sec) | Sediment Retention (%) | Water Drop (sec) |
|---|---|---|---|---|---|---|---|
| 27TH | 33.2 | 329 | 56.4 | 12.1 | 26.2 | 79.0 | 2.1 |
| 28TH | 34.4 | 328 | 47.0 | 9.6 | 26.0 | 78.8 | 4.7 |
| 29TH | 35.6 | 421 | 54.0 | 8.9 | 22.2 | 79.2 | 0.5 |
| 31ST | 34.6 | 442 | 50.7 | 10.2 | 22.5 | 75.2 | 1.1 |

EXAMPLE 18

Two handsheets of the alternate furnishes listed below were made. Iteration 32 was dried on the surface dryer at 260° F. (126.7° C.) for 1.5 minutes on each side. Iteration 33 was dried on the surface dryer at 290° F. for 1.5 minutes on each side. Some handsheets for iteration 33 were made, utilizing Decerosol OT-75 rewetting surfactant in the sheet mold dispersant water, according to methods well known to those in the field.

| 32ND ITERATION | 33RD ITERATION |
|---|---|
| FURNISH 50 lb/r (2.4 oz/yd²) | FURNISH 50 lb/r (2.4 oz/yd²) |
| 60% HERCULES TYPE 432 2.2d bicomponent fiber | 60% HERCULES TYPE 426 2.2d bicomponent fiber |
| 20% 15 d × 1.5" polyester fiber | 20% 15 d × 1.5" polyester fiber |
| 12% VISCOKRAFT ® hardwood pulp | 12% VISCOKRAFT ® hardwood pulp |
| 8% NHB405 high bulk pulp | 8% NHB405 high bulk pulp |

In this example, hydrophilicity was imparted to a Hercules polypropylene binder fiber that had a hydrophobic U.S. FDA approved finish. The Type 432 bicomponent fiber has a non-FDA approved hydrophilic finish. The Type 426 bicomponent fiber has an FDA approved hydrophobic finish. An approved rewettable surfactant was added to the fiber slurry and white water to obtain the desired hydrophilicity in the end product using the Type 426 bicomponent fiber. Iteration 33 iteration was not produced.

EXAMPLE 19

Five handsheets of the alternate furnishes listed below were made. Iteration 34 was dried on the surface dryer at 260° F. (126.7° C.) for 1.5 minutes on each side. Iteration 35 and 36 was dried on the surface dryer at 310° F. (154.4° C.) for 1.5 minutes on each side. Iteration 37 was dried at 290° F. (143.3° C.) for 1.5 minutes on each side.

| 34TH ITERATION | 35TH ITERATION |
|---|---|
| FURNISH 50 lb/r (2.4 oz/yd²) | FURNISH 50 lb/r (2.4 oz/yd²) |
| 60% HERCULES TYPE 432 2.2d bicomponent fiber | 50% HERCULES TYPE 432 2.2d bicomponent fiber |
| 20% 15d × 1.5" polyester fiber | 20% 15d × 1.5" polyester fiber |
| 12% VISCOKRAFT ® hardwood pulp | 12% VISCOKRAFT ® hardwood pulp |
| 8% NHB405 high bulk pulp | 8% NHB405 high bulk pulp |
| | 10% EMS KV140 4.2d × 6 mm copolyamide binder fiber |
| 36TH ITERATION | 37TH ITERATION |
| FURNISH 50 lb/r (2.4 oz/yd²) | FURNISH 50 lb/r (2.4 oz/yd²) |
| 55% HERCULES TYPE 432 2.2d bicomponent fiber | 60% KANEBO 4.2d × 10 mm bicomponent fiber |
| 20% 15d polyester fiber | 20% 15d polyester fiber |
| 5% EMS KV140 4.2d × 6 mm copolyamide binder fiber | 12% VISCOKRAFT ® hardwood pulp |
| 12% VISCOKRAFT ® hardwood pulp | 8% NHB405 high bulk pulp |
| 8% NHB405 high bulk pulp | |

In iteration 34 a Hercules bicomponent was evaluated as a substitute for the N720 bicomponent fiber used in iteration 11.

Iteration 34 had a lower wet burst strength than iteration 11. Iteration 34 also had a higher flow rate and lower retention rate than iteration 11.

In iterations 35 and 36 an copolyamide binder fiber (KV140) was blended with Hercules 432 bicomponent fiber. These combinations did not improve the wet burst strength.

In iteration 37, a Kanebo bicomponent (polyester sheath/polyester core) was substituted for the Hercules fiber. The wet burst strength was unacceptable.

The results of measuring the physical characteristics for the above iterations are shown in Table 4.

TABLE 4

EVALUATION OF FILTRATION FABRICS

| Iteration | Caliper (mils) | Air Perm (cfm/sqft) | Wet Burst Strength (psi) | Wet Tensile Strength (lbs/in) | Flow Rate (sec) | Sediment Retention (%) |
|---|---|---|---|---|---|---|
| 34TH | 37.5 | 519 | 58.5 | 10.7 | 20.5 | 78.8 |
| 35TH | 38.8 | 583 | 38.7 | 7.3 | 21.8 | 77.1 |
| 36TH | 39.4 | 547 | 43.4 | 9.2 | 21.4 | 78.2 |
| 37TH | 37.7 | 677 | 12.1 | 0.6 | 12.6 | 55.6 |

We claim:

1. A filtration fabric comprising:

a furnish which comprises
about 40.0% to 75.0% binder fiber, wherein the binder fiber comprises first and second binder fiber components of dissimilar denier and length, wherein said first binder fiber component is a concentric polyester sheath/polyester core bicomponent fiber of 2 denier and 0.5 inch length and said second binder fiber component is a concentric polyester sheath/polyester core; and
about 25.0% to about 60.0% pulp portion, wherein the amounts of fiber and pulp portion are calculated as a percentage of the dry weight of the furnish components; and
0.0% to about 5.0% stiffening agent, wherein the amount of stiffening agent is calculated as a percentage of the total dry weight of the fabric.

2. A filtration fabric comprising:

a furnish which comprises
about 50.0% to about 70.0% binder fiber, wherein the binder fiber comprises first and second binder fiber components of dissimilar denier and length, wherein said first binder fiber component is 2 denier and 0.5 inch length and said second binder fiber component is 15 denier and 1.5 inch length;
about 30.0% to about 50.0% pulp portion, wherein the amounts of fiber and pulp are calculated as a percentage of the dry weight of the furnish components; and
0.0% to about 15.0% stiffening agent, wherein the amount of stiffening agent is calculated as a percentage of the total dry weight of the filtration fabric.

3. A filtration fabric comprising:

a furnish which comprises
about 40.0% to 75.0% binder fiber, wherein the binder fiber comprises first and second binder fiber components of dissimilar denier and length; and
about 25.0% to about 60.0% pulp portion, wherein the amounts of fiber and pulp portion are calculated as a percentage of the dry weight of the furnish components; and
0.0% to about 5.0% stiffening agent, wherein the amount of stiffening agent is calculated as a percentage of the total dry weight of the fabric.

4. A filtration fabric comprising:
a furnish which comprises
about 50.0% to about 70.0% binder fiber, wherein the binder fiber comprises first and second binder fiber components of dissimilar denier and length;
about 30.0% to about 50.0% pulp portion, wherein the amounts of fiber and pulp are calculated as a percentage of the dry weight of the furnish components; and
0.0% to about 15.0% stiffening agent, wherein the amount of stiffening agent is calculated as a percentage of the total dry weight of the filtration fabric.

* * * * *

UNITED STATES PATENT AND TRADEMARK OFFICE
CERTIFICATE OF CORRECTION

PATENT NO. : 6,352,947 B1
DATED : March 5, 2002
INVENTOR(S) : Clement J. Haley and Larry L. Kinn It is certified that error appears in the above-identified patent and that said Letters Patent is hereby corrected as shown below:

<u>Column 2,</u>
Line 9, insert -- (preferably 0.0 to 13%) -- under "0.0% to 15%".
Line 14, change "0.0% to 5.0%" to -- 0.0% to 6.0% --.

Signed and Sealed this

Tenth Day of December, 2002

JAMES E. ROGAN
*Director of the United States Patent and Trademark Office*